US012575014B2

(12) United States Patent (10) Patent No.: US 12,575,014 B2
Deixler et al. (45) Date of Patent: Mar. 10, 2026

(54) LIGHTING CONTROL FOR A BRAIN CONTROL INTERFACE SYSTEM

(71) Applicant: SIGNIFY HOLDING B.V., Eindhoven (NL)

(72) Inventors: Peter Deixler, Arlington, MA (US); Evren Özcan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 54 days.

(21) Appl. No.: 18/729,907

(22) PCT Filed: Jan. 12, 2023

(86) PCT No.: PCT/EP2023/050611
§ 371 (c)(1),
(2) Date: Jul. 18, 2024

(87) PCT Pub. No.: WO2023/138973
PCT Pub. Date: Jul. 27, 2023

(65) Prior Publication Data
US 2025/0113424 A1 Apr. 3, 2025

Related U.S. Application Data

(60) Provisional application No. 63/300,760, filed on Jan. 19, 2022.

(30) Foreign Application Priority Data
Jan. 28, 2022 (EP) .................................... 22153806

(51) Int. Cl.
*H05B 47/105* (2020.01)
*G06F 3/01* (2006.01)
*H05B 47/175* (2020.01)

(52) U.S. Cl.
CPC ........... *H05B 47/196* (2024.01); *G06F 3/015* (2013.01); *H05B 47/105* (2020.01)

(58) Field of Classification Search
CPC ...... H05B 47/196; H05B 47/105; G06F 3/015
See application file for complete search history.

(56) References Cited

U.S. PATENT DOCUMENTS 10,551,921 B2 2/2020 Ramer et al.
2019/0307351 A1 10/2019 Tan et al.
(Continued)

FOREIGN PATENT DOCUMENTS

KR 20160095265 A * 8/2016 ........... H05B 47/105
KR 20210030325 A 3/2021
WO 2020121274 A1 6/2020

OTHER PUBLICATIONS

Mohd Shaifulrizal B Abd Rani, et al., "Detection of Eye Blinks From EEG Signals for Home Lighting System Activation.," Proceeding of the 6th International Symposium on Mechatronics and Its Applications (ISMA09), Sharjah, UAE, Mar. 2009 (4 Pages).

*Primary Examiner* — Henry Luong

(57) ABSTRACT

A brain control interface system is disclosed. The brain control interface comprises: a brain control interface configured to detect brain signals indicative of brain activity of a user in an environment, an input configured to obtain data indicative of a current light scene of one or more lighting devices in the environment, a lighting controller configured to control the one or more lighting devices, and one or more processors configured to analyze the brain signals to identify a level of noise in the brain signals when the current light scene is active, and, if the level of noise exceeds a threshold, adjust the light scene while monitoring the level of noise until a target level of noise in the brain signals has been established.

15 Claims, 5 Drawing Sheets

(56)     References Cited

U.S. PATENT DOCUMENTS

| 2019/0384392 | A1 | 12/2019 | Aimone et al. |
| 2021/0022219 | A1 | 1/2021 | Li |
| 2022/0016423 | A1 | 1/2022 | Vysokov et al. |

* cited by examiner

106

170

130

102

110

112

114

122

120

160

150

100

500

LIGHTING CONTROL FOR A BRAIN CONTROL INTERFACE SYSTEM

CROSS-REFERENCE TO PRIOR APPLICATIONS

This application is the U.S. National Phase application under 35 U.S.C. § 371 of International Application No. PCT/EP2023/050611, filed on Jan. 12, 2023, which claims the benefit of U.S. Provisional Patent Application No. 63/300,760, filed on Jan. 19, 2022 and European Patent Application Ser. No. 22/153,806.9, filed on Jan. 28, 2022. These applications are hereby incorporated by reference herein.

FIELD OF THE INVENTION

The invention relates to a brain control interface system. The invention further relates to a method of adjusting a light scene and to a computer program for executing the method.

BACKGROUND

Brainwave-based device control is a rising new technology. A brain-computer-interface (BCI) is used to detect brain signals of a user, whereupon information from these brain signals is derived. This information may, for example, be indicative of a thought or an action of the user. The thought may, for example, be indicative of a control command for a controllable device, such as a lighting device. An example of such as system is disclosed in U.S. Pat. No. 10,551,921B2. There are two main types of BCIs: non-invasive and invasive BCIs. The non-invasive versions are the most common, and comprise sensors (electrodes) placed on the human head. These measure brain activity and translate that data to a computer. Most BCIs utilize electroencephalography (EEG) systems, which typically feature electrodes are attached to the scalp, which measure the electrical current sent by the neurons inside the brain. Changes in this electrical current reflect brain activity, because when an individual performs an action or thinks about something, hundreds of thousands of neurons are fired. This generates the electrical current, which is large enough to be measured on the scalp. A computer system then tries to make sense of this data to derive the user's action or thought. Alternatives to EEG systems are electrooculography (EOG), electromyography (EMG), electrodermal activity (EDA) and photoplethysmography (PPG) systems. As alternative to utilizing electrodes on the surface of the scalp, implantable brain-computer interfaces may be used. Here, probes are inserted into the brain through an automated process performed by a surgical robot. Each probe comprises an area of wires that contains electrodes capable of locating electrical signals in the brain, and a sensory area where the wire interacts with an electronic system that allows amplification and acquisition of brain signals.

A research study (Min et al.—*Bright Illumination Reduces parietal EEG alpha activity during a sustained attention task. Brain Research,* 2013.) conducted several experiments of sustained attention on subjects under different illumination conditions. EEG was recorded from the parietal region of the brain. The study found that brain pulses were significantly influenced by the illuminance factor. Their mean values indicate that high illuminance resulted in significantly longer latencies than low illuminance. The study concluded that the illumination condition substantially influences the attentional processing as reflected in the significant modulations of EEG activity.

A related study (Figueiro et al.—*Preliminary evidence that both blue and red light can induce alertness at night. BMC Neuroscience* 2009; 10:105-105) shows that both short-wavelength and long-wavelength light increase alertness at night, as shown in EEG power change. Additionally, 10 lx of red light is also found to significantly affect the EEG measures compared to preceding dark conditions. In another study (Plitnick et al—*The effects of red and blue light on alertness and mood at night. Lighting Research and Technology* 2010; 42:449-458), two levels (10 lx and 40 lx) of blue and red lights were both found to increase EEG beta power.

In a related study (Lin, Jing et al—*Effect of long-wavelength light on electroencephalogram and subjective alertness, Lighting Research and Technology,* 2020 Jan. 5, Vol. 52) it was investigated how exposures to long-wavelength lights of two different levels (40 lx and 160 lx) affect objective alertness (as measured by EEG). A significant effect of light levels on EEG beta (13-30 Hz) power was observed. Exposure to both 40 lx and 160 lx long-wavelength lights significantly increased beta power compared to the Dim condition.

In a related study (Ackeren et al.—*A (blue) light in the dark: Blue light modulates oscillatory alpha activity in the occipital cortex of totally visually blind individuals with intact non-visual photoreception*), three participants who were visually blind but had intact non-visual responses, were subjected to an on-off patterns of blue light. The study concluded that the blue light impacts the occipital region of the brain and decreases the power of the alpha EEG rhythm in this specific part of the brain.

Light that impacts brain signals may originate from artificial lighting and/or natural daylight. The natural daylight present in the room may depend on the time of the day and/or the current position of window blinds.

SUMMARY OF THE INVENTION

The inventors have realized that light effects, for instance effects that include substantial amounts of blue light, bright light or dynamics, or light of specific wavelengths may compromise brainwave-based device control when utilizing the occipital brain region. As a result, a BCI may look at brainwaves in different regions of the brain, but these brainwaves may not reflect the correct cues for control of a device, because the resulting brainwaves may be affected by illumination (e.g. brainwaves are attenuated or amplified). This may result in false or incorrect triggers. It is therefore an object of the present invention to provide a brain control interface system that reduces the chance of false/incorrect triggers.

According to a first aspect of the present invention, the object is achieved by a brain control interface system, comprising:

- a brain control interface configured to detect brain signals indicative of brain activity of a user in an environment,
- an input configured to obtain data indicative of a current light scene of one or more lighting devices in the environment,
- a lighting controller configured to control the one or more lighting devices, and
- one or more processors configured to analyze the brain signals to identify a level of noise in the brain signals when the current light scene is active, and, if the level of noise exceeds a threshold, adjust the light scene while monitoring the level of noise until a target level of noise in the brain signals has been established.

By adjusting the light scene of the one or more lighting devices (and therewith the light output of the one or more lighting devices), the effect of the light output on the level of noise in the brain signals is reduced. Since the light effects provided by the one or more lighting devices affect the brain signals, it is beneficial to adjust the light scene to reduce the effect of the light effects. By adjusting the light scene, the brain control interface system reduces the chance of false/incorrect triggers. The adjusting of the of light scene may be incrementally adjusting the lighting scene.

The light scene may be a dynamic light scene that changes over time, wherein the dynamic light scene has a dynamics level. The one or more processors may be configured to adjust the dynamics level until the target level of noise in the brain signals has been established. The level of dynamics may be defined by the amount of change of properties of the light output of the one or more lighting devices within a time period. The properties of the light output may include but are not limited to: hue, saturation, brightness, flicker, beam direction, etc. Dynamic effects, and more specifically dynamic effects with higher dynamics levels, may affect the brain signals and result in a higher level of noise. Adjusting (reducing) the dynamics level is beneficial because it reduces the chance of false/incorrect triggers.

The one or more processors may be configured to iteratively adjust the light scene while monitoring the level of noise until the target level of noise in the brain signals has been established. The one or more processors may repeat the adjustment by further adjusting the light scene while monitoring the level of noise until the target level has been established.

The one or more processors may be configured to adjust the light scene towards a target light scene until the target level of noise in the brain signals has been established. The target light scene may be a predefined light scene. The adjusting may be incremental adjusting. The predefined light scene may comprise light output characteristics which reduce the level of noise in detected brain signals. (Iteratively/continuously/incrementally) adjusting the light scene to the target light scene—until target level of noise in the brain signals has been established—is beneficial because the (original) light scene is maintained as much as possible while reducing the level of noise. The target light scene may comprise at least one of the following characteristics: a higher intensity compared to the light scene, a lower level of dynamics compared to the light scene, and a spectrum comprising more blue light compared to the light scene. These characteristics are examples of characteristics that affect (reduce) the level of noise.

The one or more processors may be configured to analyze the brain signals to derive a control command from the brain signals for a controllable device. The one or more processors may be further configured to switch to a brain control mode when the target level of noise in the brain signals has been established, wherein, in the brain control mode, the one or more processors are configured to control the controllable device based on the derived control command. The one or more processors may only control (either directly or indirectly) the controllable device based on the derived control command only when the brain control mode is active. This is beneficial, because the controllable device is not controlled when the level of noise (still) exceeds the threshold. The one or more processors may be further configured to select the target level of noise based on an expected control command that will be provided by the user. Similarly, the one or more processors may be further configured to select the target level of noise based on an expected emotion state of the user, for instance the user may be expected to transition from neutral emotional state to a relaxed emotional state, for instance when the user has just started meditating.

The controllable device may be a lighting device of the one or more lighting devices. Alternatively, the controllable device may, for example, be a connected (home) appliance or connected (office) equipment.

The input may be configured to obtain the data indicative of the current light scene by obtaining sensor data from a light sensor (located in the environment). Alternatively, the input may be a receiver configured to receive the data indicative of the current light scene from a lighting system controller. The lighting system controller may, for example, be a central (home) lighting controller, a bridge, a smartphone, etc.

The current light scene may be provided by a plurality of lighting devices. The one or more processors may be configured to obtain position and/or orientation information indicative of a position and/or an orientation of the user relative to the plurality of lighting devices. The one or more processors may be configured to select one or more of the plurality of lighting devices based on the position and/or the orientation of the user relative to the plurality of lighting devices, and adjust the light scene by adjusting the light output of the one or more selected lighting devices. The one or more processors may, for example, be configured to select one or more lighting devices which are located (or of which their light effect is located) in the field of view of the user. Next to artificial lighting, also the natural daylight present in the room may affect the brain signals. One or more window blinds located (or of which their light effect is located) in the field of view of the user may be selected and controlled accordingly. Selecting the one or more lighting devices based on the position and/or orientation of the user is beneficial because it optimizes reduction of noise in the detected brain signals. Additionally, when multiple users would be present in the environment, the light scene for the specific user may be adjusted while minimizing the effect of the change of the light scene on other users.

The one or more processors may be configured to initiate identifying the noise levels and adjusting the light scene upon receiving a control input indicative of that the user will provide a control command. The control input may be a direct command, or for example based on a change of the user's emotional state (which may be indicative of or preceded by the control input). This is beneficial, because the one or more processors are not required to continuously monitor the noise level, but only when required when the user intends to adjust to provide the control command. The control input may be provided by a user, by a sensor or by the brain control interface. The control input may, for example, be received from the user, be received from a user interface, a sensor, a memory, etc.

According to a second aspect of the present invention, the object is achieved by a method of adjusting a light scene, the method comprising:

detecting, by a brain control interface, brain signals indicative of brain activity of a user in an environment, obtaining data indicative of a current light scene of one or more lighting devices in the environment, analyzing the EEG signals to identify a level of noise in the brain signals when the current light scene is active, and, if the level of noise exceeds a threshold, adjusting the light scene while monitoring the level of noise until a target level of noise in the brain signals has been established.

According to a third aspect of the present invention, the object is achieved by a computer program product for a computing device, the computer program product comprising computer program code to perform the method when the computer program product is run on a processing unit of the computing device.

It should be understood that the method and the computer program product may have similar and/or identical embodiments and advantages as the above-mentioned brain control interface systems.

In the context of the present invention, the term "light scene" relates to lighting control instructions/light settings for one or more lighting devices. The lighting control instructions may be the same for each lighting device, or be different for different lighting devices. The lighting control instructions may relate to one or more light settings, which may for instance be defined as RGB/HSL/HSB color values, CIE color values, brightness values, etc.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
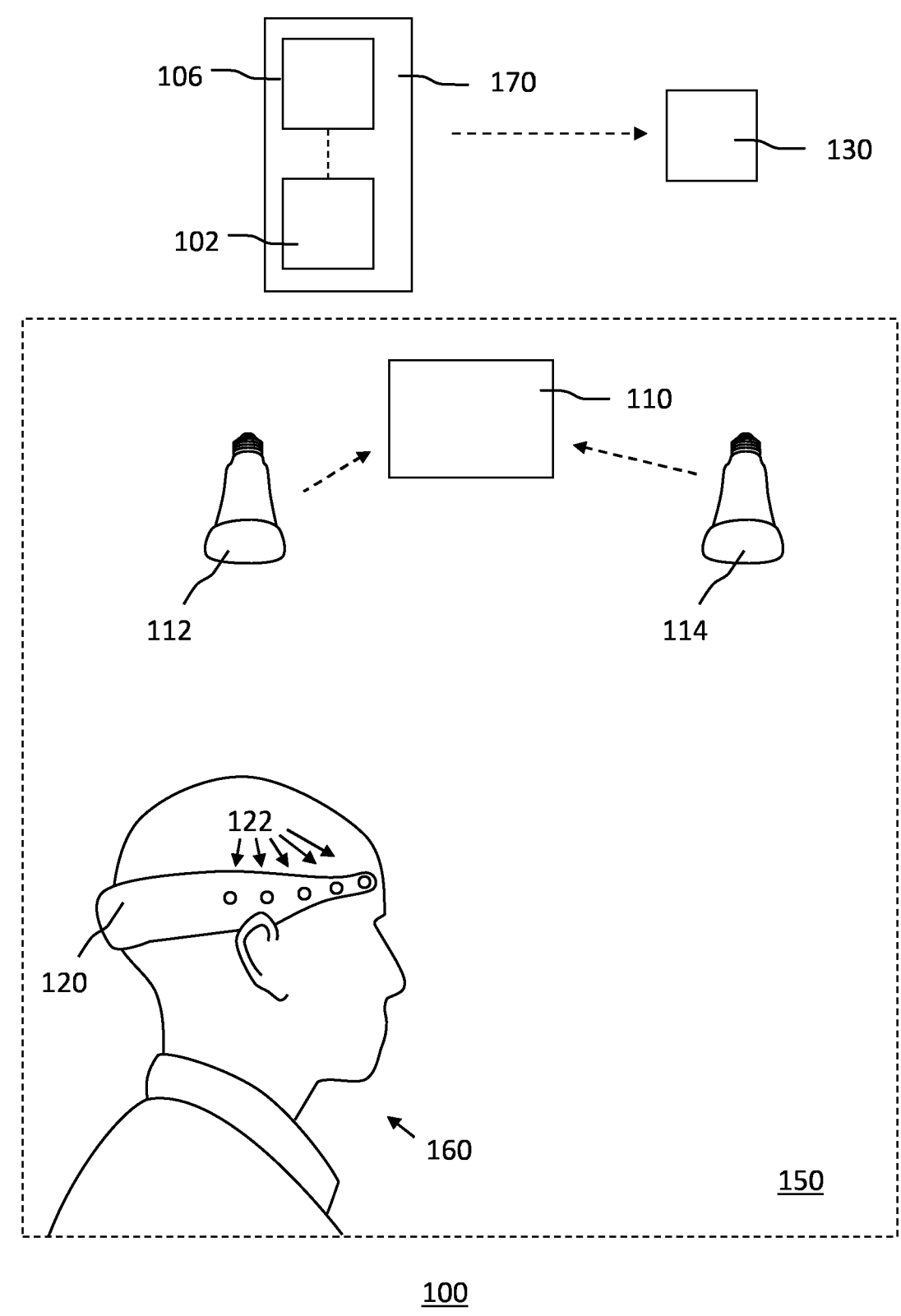
FIG. 1 shows schematically an example of a brain control interface system.

FIG. 1 shows schematically an overview of a brain control interface system 100. The brain control interface system 100 comprises a brain control interface 120 (e.g. a head-worn device). The brain control interface 120 (BCI) is configured to detect brain signals indicative of brain activity of a user 160 in an environment 150. The system 100 further comprises or more processors 106 configured to analyze the brain signals. The BCI 120 may comprise one or more electrodes 122 in contact with the user's scalp, which electrodes 122 are used for detecting EEG signals of the user. It should be understood that such a BCI 120 is an example, and that other types of brain signal detection may be used.

The brain control interface system 100 further comprises an input 102 configured to obtain data indicative of a current light scene of one or more lighting devices 112, 114 in the environment 150. The input 102 may be an input to the one or more processors 106 configured to obtain the data indicative of the current light scene of one or more lighting devices 112, 114 from a memory, for instance memory 108. Alternatively, the input 102 may be configured to obtain the data indicative of the current light scene by obtaining sensor data from a light sensor located in the environment 150. Alternatively, the input 102 may be a receiver configured to (wirelessly) receive the data indicative of the current light scene, for instance from a lighting controller 110 such as a central home/office control system, from a remote lighting controller connected to the one or more lighting devices 112, 114 via the cloud, etc. The lighting controller 110 may be configured to control the one or more lighting devices 112, 114 by communicating lighting control signals to the one or more lighting devices 112, 114 (e.g. via Zigbee, BLE, Ethernet, etc.) to generate the light scene. The control signals comprise light settings indicative of light output properties (for example hue, saturation, brightness, beam direction, etc.). The one or more lighting devices 112, 114 are configured to receive the control signals and a driver is configured to adjust the light output of one or more (LED) light sources accordingly.

The brain control interface system 100 further comprises one or more processors 106 (e.g. circuitry, one or more microcontrollers, etc.). The one or more processors 106 are configured to obtain data indicative of the brain signals as detected by the BCI 120. The one or more processors 106 may be comprised in a single device or distributed across multiple devices, which may depend on the system architecture of the BCI system 100. For instance, in the example of FIG. 1, the one or more processors 106 and the input 102 are comprised in a single device 170, which device 170 is communicatively coupled with the lighting controller 110, the BCI 120 and the controllable device 130. It should be understood that this system architecture is merely an example, and that the skilled person is able to design alternative system architectures without departing from the scope of the appended claims. For instance, a first processor of the one or more processors 106 may be comprised in the BCI 120, and a second processor on a remote server or in the lighting controller 110. In another example, the one or more processors 106 and the input 102 may be comprised in the lighting controller 110. In another example, a first processor of the one or more processors 106 may be comprised in a remote server and a second processor in the lighting controller 110. In yet another example, one or more of the system components 102, 106 may be comprised in the BCI 120, or in the controllable device 130.

The one or more processors 106 are configured to analyze the brain signals to identify a level of noise in the brain signals when the current light scene is active. Light impacting brain signals may originate from artificial lighting and/or natural daylight. The natural daylight present in the room may depend on the time of the day and/or the current position of window blinds. The one or more processors 106 may, for example, compare the detected brain signals to reference brain signals to determine the level of noise based on the differences between the detected brain signals and the reference brain signals. Additionally or alternatively, the one or more processors 106 may compare the detected brain signals with one or more thresholds and/or baselines to determine level of noise. In another example, the one or more processors 106 may be configured to obtain the data indicative of a current light scene of one or more lighting devices in the environment, and to determine which brain signals may be affected by the current light scene. For instance, dynamic effects, and more specifically dynamic effects with higher dynamics levels, may affect brain signals originating from certain regions of the brain, and the one or more processors 106 may be configured to analyze these regions for noise to determine the level of noise. Certain colors of light may also affect the brain signals. For instance, short wavelength light, such as blue light, impacts the occipital region of the brain and decreases the power of the alpha EEG rhythm in this specific part of the brain. Similarly, long wavelength light, such as red light, affects the beta EEG rhythm. The one or more processors 106 may be configured to analyze a specific region associated with that light scene for noise to determine the level of noise.

The one or more processors 106 are further configured to determine if the level of noise exceeds a threshold, and if so, adjust the light scene (by controlling the one or more lighting devices 112, 114 via the lighting controller 110) while monitoring the level of noise until a target level of noise in the brain signals has been established. The one or more processors 106 may, for example, change the color, the brightness or a level of dynamics of the light. Certain light effects affect the brain signals less compared to others, and the one or more processors 106 may be configured to adjust the light scene such that the adjusted light scene reduces the effect on the brain signals. The one or more processors 106 may, for example, increase the intensity of the light scene, adjust the color point of the light scene (e.g. towards more blueish light), reduce the level of dynamics of a dynamic light scene, etc. The one or more processors 106 may, for example, control the one or more lighting devices 112, 114 and gradually adjust the light scene until the target level of noise in the brain signals has been established. The one or more processors 106 may for example gradually change the light scene from the current light scene to a target light scene. Alternatively, the one or more processors may be configured to iteratively adjust the light scene while monitoring the level of noise until the target level of noise in the brain signals has been established. In other words, the one or more processors 106 may control the one or more lighting devices 112, 114 sequentially according to different light scenes until a light scene is active for which the level of noise in the brain signals is below the threshold.

Figures 2A, 2B:
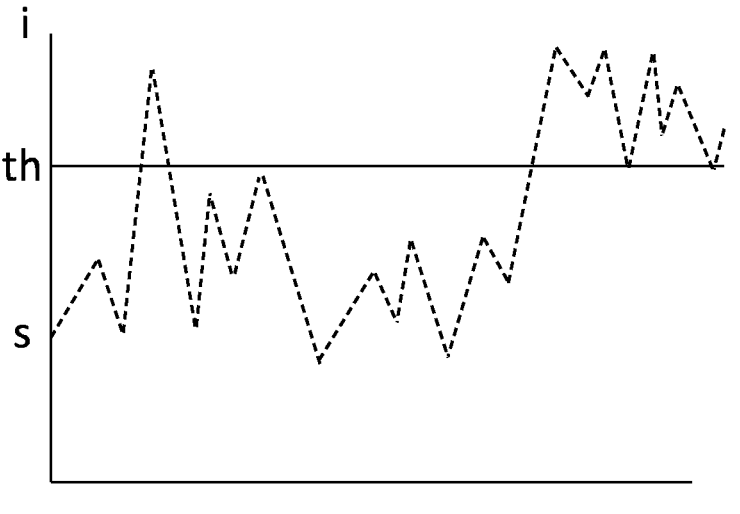
FIG. 2a shows schematically an example of a set of detected brain signals affected by illumination.
FIG. 2b shows schematically an example of the set of brain signals of FIG. 2a under different illumination.

FIG. 2a shows a graph schematically illustrating brain signals s captured over time t, and a threshold value th. The one or more processors 106 may determine that the intensity i of the brain signals s exceed threshold th, which may be indicative of that the level of noise exceeds a threshold. Based thereon, the one or more processors 106 may adjust the active light scene to reduce the level of noise, resulting in brain signals s that do not exceed the threshold th as illustrated in FIG. 2b. Alternatively, not depicted, the threshold may comprise both an upper threshold and a lower threshold, wherein the brain signals no longer exceed the threshold if the brain signals no longer exceed the upper threshold and the lower threshold.

Figures 3A, 3B:
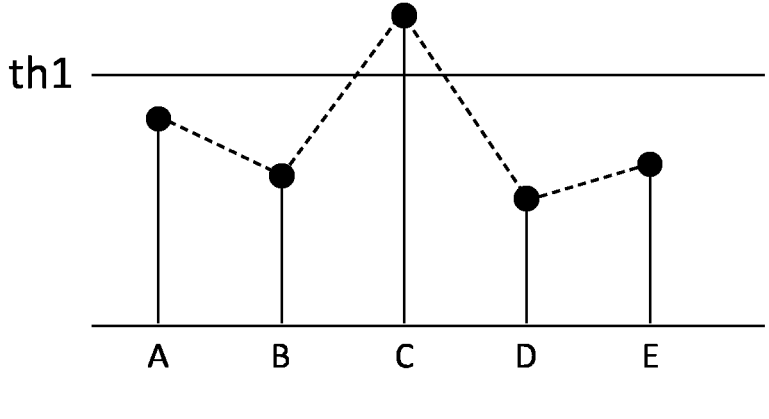
FIG. 3a shows schematically an example of a set of detected brain signals affected by illumination.
FIG. 3b shows schematically an example of the set of brain signals of FIG. 2a under different illumination.

FIG. 3a shows another example of a graph, wherein a set of brain signals are detected. Letters A-E indicate different brain regions, and the length of the bars indicates the level of (change in) brain activity for the different brain regions. Each brain signal A-E may correspond to an electrode positioned on the user's scalp. The one or more processors 106 may determine that the intensity of the brain signals C exceed threshold th1, which may be indicative of that the level of noise for brain region C exceeds a threshold. Based thereon, the one or more processors 106 may adjust the active light scene to reduce the level of noise, resulting in brain signals A-E of FIG. 3b, which do not exceed the threshold th1.

The one or more processors 106 may be configured to adjust the light scene towards a target light scene until the target level of noise in the brain signals has been established. The target light scene may be a predefined light scene. The predefined light scene may comprise light output characteristics which reduce the level of noise in detected brain signals. By gradually adjusting the light scene towards the target light scene, the original (current) light scene is maintained as much as possible while reducing the level of noise. The target light scene may comprise at least one of the following characteristics: a higher intensity compared to the light scene, a lower level of dynamics compared to the light scene, and a spectrum comprising more blue light compared to the light scene. These characteristics are examples of characteristics that affect (reduce) the level of noise. If, for example, the current light scene is a reddish light scene, the one or more processors 106 may adjust the light scene towards a blueish target light scene until the target level of noise in the brain signals has been established. If during the adjustment (transition) towards the blueish light scene the target level of noise has been established, the one or more processors 106 may cease the adjustment towards the target blueish light scene. In another example, the current light scene may be a light scene with low brightness (e.g. 10%), and the one or more processors 106 may adjust the light scene towards a light scene with a higher brightness (e.g. 100%) until the target level of noise in the brain signals has been established. If at a certain brightness (e.g. 30%), the target level of noise has been established, the one or more processors 106 may cease the adjustment towards the target light scene with the higher brightness (e.g. 100%). In another example, the current light scene may be a dynamic light scene with a (high) level of dynamics, and the one or more processors 106 may adjust the light scene towards a target dynamic light scene with a lower level of dynamics until the target level of noise in the brain signals has been established. If at a certain level of dynamics the target level of noise has been established, the one or more processors 106 may cease the adjustment towards the target light scene with the lower level of dynamics.

The one or more processors 106 may be configured to analyze the brain signals to derive a control command from the brain signals for a controllable device 130. The controllable device may be a lighting device of the one or more lighting devices. Alternatively, the controllable device 130 may, for example, be a connected (home) appliance or connected (office) equipment. The one or more processors 106 may be further configured to switch to a brain control mode when the target level of noise in the brain signals has been established, wherein, in the brain control mode, the one or more processors 106 are configured to control the controllable device 130 based on the derived control command. The one or more processors 106 may only control (either directly or indirectly) the controllable device 130 based on the derived control command only when the brain control mode is active.

The one or more processors 106 may be further configured to select the target level of noise based on an expected control command that will be provided by the user. For certain control commands a lower level of noise may be required, which may be necessary to distinguish between different control commands, which different control commands may be control commands for the same device/ service. The one or more processors 106 may thus be configured to obtain an expected control command and select the target level of noise based on the expected control command. The expected control command may be obtained from a memory, or for example from a machine learning system that has learned which control commands have been provided over time.

Additionally or alternatively, the one or more processors 106 may be configured to analyze the brain signals to derive information about the user, for instance about the mental/emotional state of the user. The current light scene may affect the brain signals such that the level of noise is too high for the one or more processors 106 to derive this information. If the one or more processors 106 determine that the level of noise exceeds the threshold, the one or more processors may control the one or more lighting devices 112, 114 to adjust the light scene to reduce the noise, and to properly derive the information about the user.

The current light scene may be provided by a plurality of lighting devices 112, 114. The one or more processors 106 may be configured to obtain position and/or orientation information indicative of a position and/or an orientation of the user 160 relative to the plurality of lighting devices 112, 114. The one or more processors 106 may be configured to select one or more of the plurality of lighting devices based on the position and/or the orientation of the user 160 relative to the plurality of lighting devices 112, 114, and adjust the light scene by (only) adjusting the light output of the one or more selected lighting devices 112, 114. The positions of the plurality of lighting devices 110, 112, 114, 116 relative to the user may be obtained (e.g. via the input) from an (indoor) positioning system, for instance an RF-based positioning system, a coded light positioning system, a camera-based positioning system, from an internal memory, etc. Alternatively, the positions of the plurality of lighting devices 110, 112, 114, 116 may be defined by a user via a user interface, wherein the user may provide information about the positions of the plurality of lighting devices 112, 114, for instance by positioning virtual counterparts of the lighting devices on a map of an environment wherein the lighting devices are located. The user may further indicate a typical user position (and orientation) on the map. Such techniques for determining locations of lighting devices in an environment relative to a user are known in the art and will therefore not be discussed in detail. The one or more processors 106 may be configured to select one or more lighting devices which are located (or of which their light effect is located) in the field of view of the user based on the position and/or the orientation of the user relative to the plurality of lighting devices 112, 114. When multiple users would be present in the environment, the light scene for the specific user may be adjusted while minimizing the effect of the change of the light scene on other users.

Figure 4:
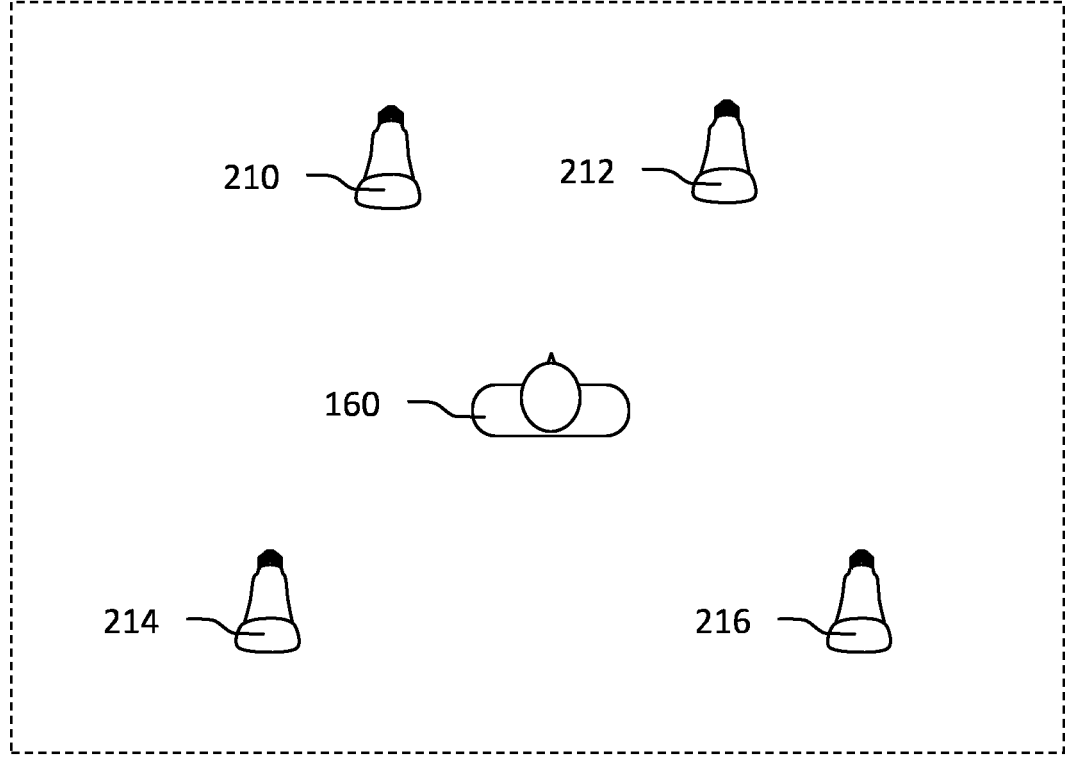
FIG. 4 shows schematically an example of a system wherein lighting devices are selected based on the position and/or the orientation of the user relative to the plurality of lighting devices.

FIG. 4 shows schematically an example of a system wherein lighting devices 210, 212, 214, 216 are selected based on the position and/or the orientation of the user 160 relative to the plurality of lighting devices 210, 212, 214, 216. The one or more processors 106 may for example determine that lighting devices 210 and 212 are located closer to the user 240 (and within the field of view of the user) compared to lighting devices 214 and 216. Based thereon, the one or more processors 106 may select lighting devices 210 and 212 and adjust the light scene by adjusting the light output of the one or more selected lighting devices 210 and 212. The light output of non-selected lighting devices 214 and 216 may be maintained or adjusted to a lesser extent compared to the adjustment of the light output of the selected lighting devices 210 and 212.

The one or more processors 106 may be configured to initiate identifying the noise levels and adjusting the light scene upon receiving a control input indicative of that the user will provide a control command. The one or more processors 106 may thus monitor the noise level only when required when the user intends to adjust to provide the control command. The control input may be provided by a user, by a sensor or by the brain control interface. The control input may, for example, be received from the user, be received from a user interface (e.g. a user interface of an augmented reality device, a voice assistant, a smart device, etc.). Alternatively, a (remote or local) sensor may detect that the user is about to provide a control command. Alternatively, the BCI may determine, based on detected brain signals, that a user is in the process of or planning to generate the control command. Alternatively, the one or more processors may access a memory storing moments in time when the user typically provides a control command, and initiate identifying the noise levels and adjusting the light scene at these moments in time.

Figure 5:
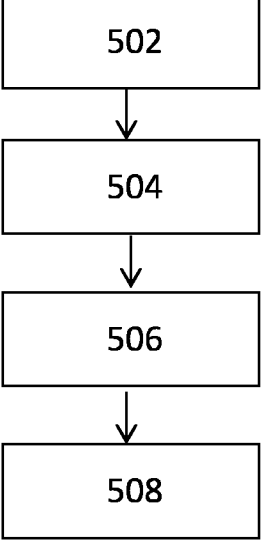
FIG. 5 shows schematically an example of a method of adjusting a light scene.

FIG. 5 shows schematically an example of a method of adjusting a light scene. The method 500 comprises detecting 502, by a brain control interface, brain signals indicative of brain activity of a user in an environment, obtaining 504 data indicative of a current light scene of one or more lighting devices in the environment, analyzing 506 the EEG signals to identify a level of noise in the brain signals when the current light scene is active, and, if the level of noise exceeds a threshold, adjusting 508 the light scene while monitoring the level of noise until a target level of noise in the brain signals has been established.

The method 500 may be executed by computer program code of a computer program product when the computer program product is run on a processing unit of a computing device, such as the one or more of the one or more processors 106 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g.

updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A brain control interface system, comprising:
a brain control interface configured to detect brain signals indicative of brain activity of a user in an environment,
an input configured to obtain data indicative of a current light scene of one or more lighting devices in the environment,
a lighting controller configured to control the one or more lighting devices, and
one or more processors configured to analyze the brain signals to identify a level of noise in the brain signals when the current light scene is active, and, if the level of noise exceeds a threshold, adjust the light scene while monitoring the level of noise until a target level of noise in the brain signals has been established.

2. The brain control interface system of claim 1, wherein the light scene is a dynamic light scene that changes over time, wherein the dynamic light scene has a dynamics level, and wherein the one or more processors are configured to adjust the dynamics level until the target level of noise in the brain signals has been established.

3. The brain control interface system of claim 1, wherein the one or more processors are configured to iteratively adjust the light scene while monitoring the level of noise until the target level of noise in the brain signals has been established.

4. The brain control interface system of claim 1, wherein the one or more processors are configured to adjust the light scene towards a target light scene until the target level of noise in the brain signals has been established.

5. The brain control interface system of claim 4, wherein the target light scene comprises at least one of the following characteristics:
a higher intensity compared to the light scene,
a lower level of dynamics compared to the light scene, and
a spectrum comprising more blue light compared to the light scene,
a spectrum comprising more red light compared to the light scene.

6. The brain control interface system of claim 1, wherein the one or more processors are configured to analyze the brain signals to derive a control command from the brain signals for a controllable device, and wherein the one or more processors are further configured to switch to a brain control mode when the target level of noise in the brain signals has been established, wherein, in the brain control mode, the one or more processors are configured to control the controllable device based on the derived control command.

7. The brain control interface system of claim 6, wherein the controllable device is a lighting device of the one or more lighting devices.

8. The brain control interface system of claim 6, wherein the one or more processors are configured to select the target level of noise based on an expected control command that will be provided by the user.

9. The brain control interface system of claim 1, wherein the input is configured to obtain the data indicative of the current light scene by obtaining sensor data from a light sensor.

10. The brain control interface system of claim 1, wherein the input is a receiver configured to receive the data indicative of the current light scene from a lighting system controller.

11. The brain control interface system of claim 1, wherein the current light scene is provided by a plurality of lighting devices,
wherein the one or more processors are configured to obtain position and/or orientation information indicative of a position and/or an orientation of the user relative to the plurality of lighting devices, and
wherein the one or more processors are configured to select one or more of the plurality of lighting devices based on the position and/or the orientation of the user relative to the plurality of lighting devices, and adjust the light scene by adjusting the light output of the one or more selected lighting devices.

12. The brain control interface system of claim 1, wherein the one or more processors are configured to initiate identifying the noise levels and adjusting the light scene upon receiving a control input indicative of that the user will provide a control command.

13. The brain control interface system of claim 12, wherein the control input is provided by a user, by a sensor or by the brain control interface.

14. A method of adjusting a light scene, the method comprising:
detecting, by a brain control interface, brain signals indicative of brain activity of a user in an environment,
obtaining data indicative of a current light scene of one or more lighting devices in the environment,
analyzing the brain signals to identify a level of noise in the brain signals when the current light scene is active, and,
if the level of noise exceeds a threshold, adjusting the light scene while monitoring the level of noise until a target level of noise in the brain signals has been established.

15. A computer program product for a computing device, the computer program product comprising computer program code to perform the method of claim 14 when the computer program product is run on a processing unit of the computing device.

* * * * *